United States Patent
Riar et al.

(10) Patent No.: US 11,728,738 B2
(45) Date of Patent: Aug. 15, 2023

(54) MODULAR SOLID-STATE POWER CONVERTER AND FAULT PROTECTOR

(71) Applicant: Hamilton Sundstrand Corporation, Charlotte, NC (US)

(72) Inventors: Baljit Singh Riar, Rocky Hill, CT (US); Suman Dwari, Vernon, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/327,119

(22) Filed: May 21, 2021

(65) Prior Publication Data

US 2022/0376626 A1    Nov. 24, 2022

(51) Int. Cl.
  *H02M 3/335*  (2006.01)
  *H02J 7/00*   (2006.01)
  *H02M 1/32*   (2007.01)

(52) U.S. Cl.
  CPC ....... *H02M 3/33576* (2013.01); *H02J 7/0068* (2013.01); *H02M 1/32* (2013.01)

(58) Field of Classification Search
  None
  See application file for complete search history.

(56) References Cited

U.S. PATENT DOCUMENTS

| | | | |
|---|---|---|---|
| 8,890,465 B2 | 11/2014 | Marquardt et al. | |
| 10,454,393 B2 | 10/2019 | Paschedag et al. | |
| 10,476,264 B2 | 11/2019 | Vijayan et al. | |
| 2007/0195557 A1* | 8/2007 | Su | H02M 3/285 363/17 |
| 2016/0072312 A1* | 3/2016 | Ichikawa | H02J 7/025 307/104 |
| 2020/0343824 A1 | 10/2020 | Bohllander | |
| 2021/0067047 A1 | 3/2021 | Hudson et al. | |

FOREIGN PATENT DOCUMENTS

EP    3696931 A1    8/2020

OTHER PUBLICATIONS

Barzkar et al., "Electric Power Systems i More and All Electric Aircraft: A Review". IEEE Access, vol. 8, 2020, pp. 169314-169332.
Search Report issued in European Patent Application No. 22174646. 4; Application Filing Date May 20, 2022; dated Oct. 19, 2022 (7 pages).

* cited by examiner

*Primary Examiner* — Daniel Kessie
*Assistant Examiner* — Terrence R Willoughby
(74) *Attorney, Agent, or Firm* — Cantor Colburn LLP

(57) ABSTRACT

An electrical power distribution system includes a first high side sub-module including a high side converter and a high side energy storage device. The first high side sub-module is electrically coupled to a high side load that requires a high voltage or medium voltage DC, the high voltage DC being higher than the medium voltage DC. The system also includes a first low side sub-module including a low side converter and a low side energy storage device. The first high side sub-module and the first low side sub-module are configured to be inductively coupled. The first high side sub-module and the first low side sub-module form a first module.

18 Claims, 4 Drawing Sheets

MODULAR SOLID-STATE POWER CONVERTER AND FAULT PROTECTOR

BACKGROUND

Exemplary embodiments pertain to the art of electrical power distribution and, in particular, to a modular solid-state power converter and fault protector.

Electrical power distribution presents a challenge in applications with an increasing demand for power and with loads that require different levels of power. Electric aircraft and aerospace applications, for example, may require a high voltage direct current (HVDC) system (e.g., on the order of 3 kilovolts (kV) for propulsion). DC-to-DC conversion may be performed in stages to provide power to high voltage systems like the wing ice protection system (e.g., on the order of 800 V) and, ultimately, devices that require low voltage DC (LVDC) (e.g., on the order of 28 V).

BRIEF DESCRIPTION

In one embodiment, an electrical power distribution system includes a first high side sub-module including a high side converter and a high side energy storage device. The first high side sub-module is electrically coupled to a high side load that requires a high voltage or medium voltage DC, the high voltage DC being higher than the medium voltage DC. The system also includes a first low side sub-module including a low side converter and a low side energy storage device. The first high side sub-module and the first low side sub-module are configured to be inductively coupled. The first high side sub-module and the first low side sub-module form a first module.

Additionally or alternatively, in this or other embodiments, the first low side sub-module is electrically coupled to a low side load that requires a low voltage DC, the low voltage DC being lower than the medium voltage DC or to a low side battery.

Additionally or alternatively, in this or other embodiments, the first low side sub-module is connected to a DC source and the first low side sub-module is configured to transfer power to the first high side sub-module.

Additionally or alternatively, in this or other embodiments, the system also includes a second module including a second high side sub-module and a second low side sub-module that are inductively coupled.

Additionally or alternatively, in this or other embodiments, the first high side sub-module and the second high side sub-module are connected in series to the high side load.

Additionally or alternatively, in this or other embodiments, the first low side sub-module and the second low side sub-module are connected in series to a load, a battery, or a DC source.

Additionally or alternatively, in this or other embodiments, the first low side sub-module and the second low side sub-module are connected in parallel to a load, a battery, or a DC source.

Additionally or alternatively, in this or other embodiments, the high side energy storage device or the low side energy storage device is a direct current (DC) capacitor or a battery.

Additionally or alternatively, in this or other embodiments, the high side DC capacitor in the first high side sub-module is arranged to build up charge based on a fault current detection and to be outside a path of current flow based on a lack of the fault current detection.

Additionally or alternatively, in this or other embodiments, the first high side sub-module includes a second high side converter configured to function as an inverter based on the high side converter being configure to function as a DC-to-DC converter and the low side converter being configured to function as a rectifier.

In another embodiment, a method of assembling an electrical power distribution system includes assembling a first high side sub-module to include a high side converter and a high side energy storage device and electrically coupling the first high side sub-module to a high side load that requires a high voltage or medium voltage DC. The high voltage DC being higher than the medium voltage DC. The method also includes assembling a first low side sub-module to include a low side converter and a low side energy storage device and arranging the first high side sub-module and the first low side sub-module to be inductively coupled. The first high side sub-module and the first low side sub-module form a first module.

Additionally or alternatively, in this or other embodiments, the method also includes electrically coupling the first low side sub-module to a low side load that requires a low voltage DC, the low voltage DC being lower than the medium voltage DC, or connecting the first low side sub-module to a low side battery.

Additionally or alternatively, in this or other embodiments, the method also includes connecting the first low side sub-module to a DC source for power transfer from the first low side sub-module to the first high side sub-module.

Additionally or alternatively, in this or other embodiments, the method also includes assembling a second module to include a second high side sub-module and a second low side sub-module that are inductively coupled.

Additionally or alternatively, in this or other embodiments, the method also includes connecting the first high side sub-module and the second high side sub-module to the high side load in series.

Additionally or alternatively, in this or other embodiments, the method also includes connecting the first low side sub-module and the second low side sub-module to a load, a battery, or a DC source in series.

Additionally or alternatively, in this or other embodiments, the method also includes connecting the first low side sub-module and the second low side sub-module to a load, a battery, or a DC source in parallel.

Additionally or alternatively, in this or other embodiments, the high side energy storage device or the low side energy storage device is a direct current (DC) capacitor or a battery.

Additionally or alternatively, in this or other embodiments, the method also includes arranging the high side DC capacitor in the first high side sub-module to build up charge based on a fault current detection and to be outside a path of current flow based on a lack of the fault current detection.

Additionally or alternatively, in this or other embodiments, the assembling the first high side sub-module includes arranging a second high side converter to function as an inverter based on the high side converter being configure to function as a DC-to-DC converter and the low side converter being configured to function as a rectifier.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

As previously noted, providing the appropriate voltage needed by the various devices of a system (e.g., an aircraft) may involve DC-to-DC conversion. Additionally, a circuit breaker may be used to break a fault current. A prior approach involves a LVDC bus and a HVDC bus connected in one or more power conversion stages. A circuit breaker arranged prior to a converter breaks a fault current. That is, one circuit breaker is arranged between the source and load to break the fault current.

Embodiments of the systems and methods detailed herein relate to a modular solid-state power converter and fault protector. The functions of converting power and addressing fault current are integrated in a number of modules with each module for conversion and fault protection being made up of a sub-module on the high or medium voltage DC (HVDC/MVDC) side and a sub-module on the LVDC side. Sub-modules on the HVDC/MVDC side of each module are electrically coupled to a load in series while sub-modules on the LVDC side are electrically coupled to a source, load, or battery in parallel or in series. HVDC (e.g., 3 kV), MVDC (e.g., 800 V), LVDC (e.g., 28V) are not limited by a particular range of voltages but may be defined relative to each other. As previously noted, each module is made up of a sub-module on the HVDC/MVDC side and a sub-module on the LVDC side. The sub-modules of a module are magnetically coupled to facilitate power transfer from the high side to the low side or from the low side to the high side over an air gap while providing galvanic isolation between the two sides. As detailed, fault current may be limited or controlled rather than only being broken based on the fault protection integrated into each sub-module.

Figure 1:
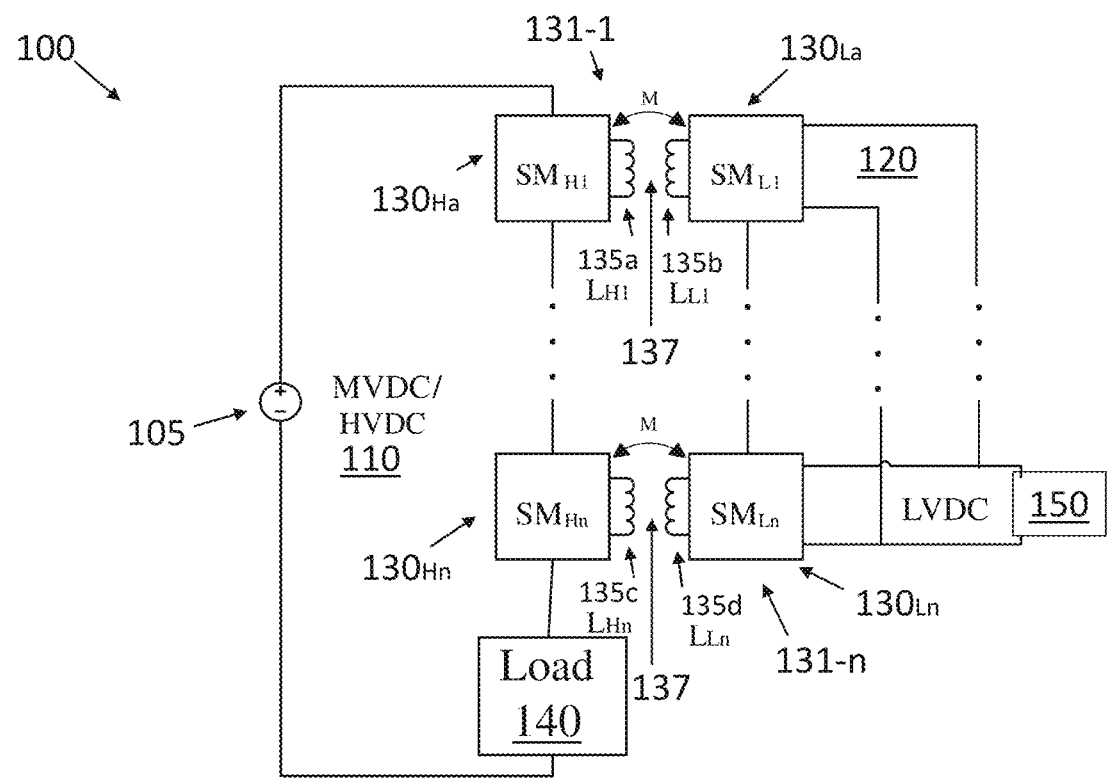
FIG. 1 is a block diagram of a power transfer system including modular solid-state power conversion and fault protection according to an exemplary embodiment.

FIG. 1 is a block diagram of a power transfer system 100 including modular solid-state power conversion and fault protection according to an exemplary embodiment. The power transfer system 100 includes a high side 110 (MVDC or HVDC) and a low side 120 (LVDC). The power transfer system 100 is indicated as including a number of modules 131-1 through 131-$n$ (generally referred to as 131). Two of the modules 131-1 and 131-$n$ are shown for explanatory purposes. Module 131-1 includes a high side sub-module 130$_{Ha}$ (indicated as SM$_{H1}$) and a low side sub-module 130$_{La}$ (indicated as SM$_{L1}$), and module 131-$n$ includes a high side sub-module 130$c$ (indicated as SM$_{Hn}$) and a low side sub-module 130$d$ (indicated as SM$_{Ln}$), each referred to generally as high side sub-module 130$_H$ and low side sub-module 130$_L$ or sub-module 130. High side sub-module 130$_{Ha}$ and low side sub-module 130$_{La}$ respectively include inductors 135$a$ and 135$b$, referred to as L$_{H1}$ and L$_{L1}$, and high side sub-module 130$_H$ and low side sub-module 130$_{Ln}$ respectively include inductors 135$c$ and 135$d$, referred to as L$_{Hn}$ and L$_{Ln}$. Generally, these are referred to as inductors 135.

Thus, the exemplary power transfer system 100 includes any number of modules 131, and each module 131 includes a high side sub-module 130$_H$ and a low side sub-module 130$_L$ that are magnetically coupled by their respective inductors 135, as indicated by mutual inductance value M. The magnetic coupling provides galvanic isolation between the high side 110 and the low side 120 while transferring power from the high side 110 to the low side 120 or from the low side 120 to the high side 110 over an air gap 137.

As shown in FIG. 1, on the high side 110, the high side sub-modules 130$_H$ are connected in series between an input DC power source 105 and a high side load 140. Based on the series connection, the voltage and power rating of the high side sub-modules 130$_H$ scales down in proportion to the number of high side sub-modules 130$_H$. On the low side 120, the low side sub-modules 130$_L$ are connected in parallel to a unit 150. According to an exemplary embodiment, the unit 150 is a load. According to an alternate embodiment, the unit 150 is a battery. According to yet another exemplary embodiment, the unit 150 is a DC source such that power transfer is from the low side 120 to the high side 110. Based on the parallel connection, the current and power rating of the low side sub-modules 130$_L$ scales down in proportion to the number of low side sub-modules 130$_L$.

Figure 2:
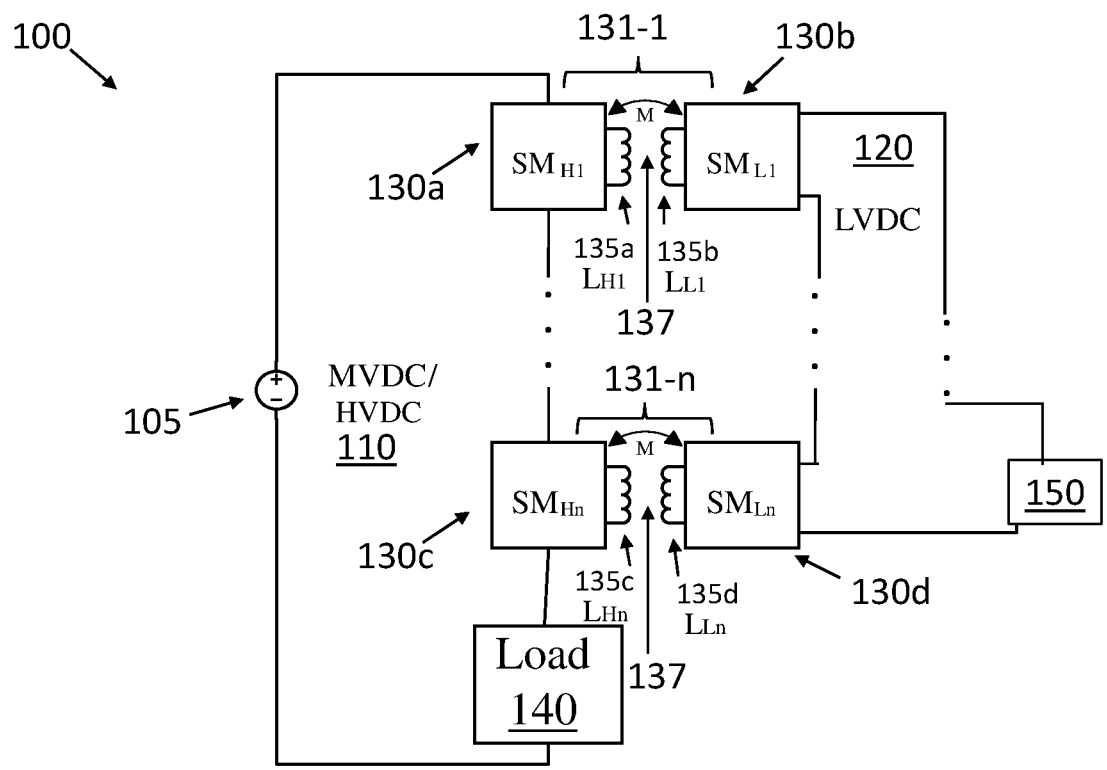
FIG. 2 is a block diagram of a power transfer system including modular solid-state power conversion and fault protection according to an exemplary embodiment.

FIG. 2 is a block diagram of a power transfer system 100 including modular solid-state power conversion and fault protection according to an exemplary embodiment. The exemplary embodiment shown in FIG. 2 differs from that in FIG. 1 only on the low side 120. Specifically, the low side sub-modules 130$_L$ are connected in series to the unit 150. As previously noted, the unit 150 may be a load, a battery, or a DC source according to alternate embodiments. Based on the series connection, voltage across each low side sub-module 130$_L$ is scaled down in proportion to the number of low side sub-modules 130$_L$.

Figure 3:
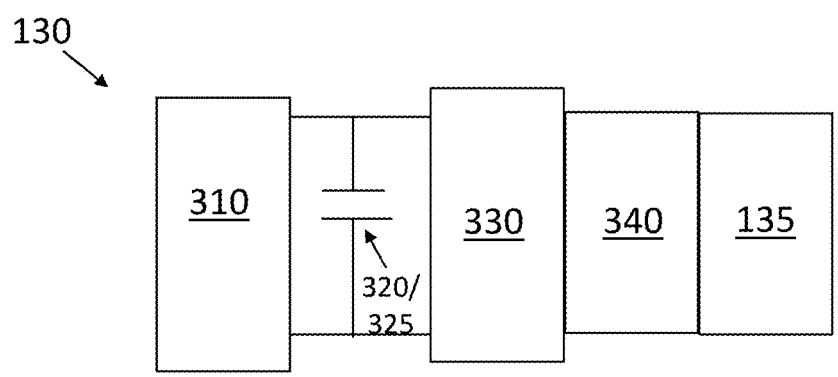
FIG. 3 details an exemplary sub-module according to one or more embodiments.

FIG. 3 details an exemplary sub-module 130 according to one or more embodiments. The presence or order of the components discussed with reference to FIG. 3 may be altered according to different embodiments. Further, the high side sub-module 130$_H$ and the low side sub-module 130$_L$ of a module 131 need not be assembled in the same way. For example, the order shown in FIG. 3 may be reversed within a sub-module 130 on the low side 120. Converters 310 and 330 are separated by an energy storage device 320. In the exemplary embodiment shown in FIG. 3, the energy storage device 320 is a DC capacitor 325. The converters 310 and 330 may each be configured as a full bridge converter, half bridge converter, or T-type three level converter, for example. The DC capacitor 325 may be a single or center-tapped DC bus capacitor according to alternate embodiments. The role of the DC capacitor 325 or other embodiment of the energy storage device 320 in fault mitigation is further discussed with reference to FIGS. 5A and 5B. Based on one or both of the converters 310 and 330 and the energy storage device 320 (e.g., DC capacitor 325), each sub-module 130 represents a modular solid-state power converter and fault protector according to one or more embodiments.

An impedance network 340 may be included to enhance power transfer and improve the harmonics of the converters 310, 330 and may be implemented according to a number of alternate embodiments. For example, the impedance network 340 may be a z-impedance network, a parallel inductor-capacitor (LC) network, a series LC network, or a string of LC networks. According to additional alternates, the impedance network 340 may be a capacitor-inductor-capacitor (CLC) network, a CLC network with coupled inductors, or an inductor-capacitor-inductor (LCL) network. According to yet another embodiment, as shown in FIGS. 5A and 5B, for example, the inductor 135 may additionally serve the function of the impedance network 340.

The presence and function of the converts 310, 330 may be based on whether the sub-module 130 is a high side sub-module $130_H$ or a low side sub-module $130_L$ and on the direction of power transfer. When power transfer is from the high side sub-module $130_H$ to the low side sub-module $130_L$, the converter 310 of the high side sub-module $130_H$ is a DC-to-DC converter to convert the MVDC or HVDC to LVDC. The converter 330 of the high side sub-module $130_H$ is an inverter that transforms the LVDC to alternating current (AC) to facilitate the inductive coupling. In this case, the converter 330 of the low side sub-module $130_L$ functions as a rectifier that outputs the LVDC on the low side 120, and the converter 310 is not needed in the low side sub-module $130_L$. This is the exemplary arrangement shown in FIGS. 5A and 5B. As another example, when power transfer is from the low side sub-module $130_L$ to the high side sub-module $130_H$, the low side sub-module $130_L$ may include a converter 330 that performs DC-to-DC conversion and a converter 310 that functions as an inverter to produce AC that facilitates inductive coupling (i.e., coupling of magnetic flux).

Figure 4:
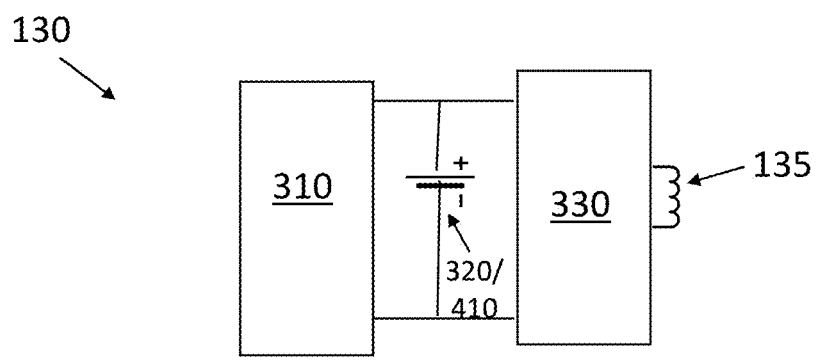
FIG. 4 details an exemplary sub-module according to one or more embodiments.

FIG. 4 details an exemplary sub-module 130 according to one or more embodiments. The sub-module 130 shown in FIG. 4 may be a high side sub-module $130_H$ for explanatory purposes. A battery 410 is used as the energy storage device 320 in the exemplary high side sub-module $130_H$. A set of batteries 410 acting as the energy storage devices 320 in the set of high side sub-modules $130_H$ may replace a high voltage battery connected directly or via another DC-to-DC converter at the high side. The set of batteries 410 is easier to design and is safer and more reliable than a single high voltage battery. In addition, multiple battery chemistries of different ages may be mixed via the set of batteries 410 and managed in their individual high side sub-modules $130_H$. In further alternate embodiments, the energy storage device 320 may have other implementations.

Figures 5A, 5B:
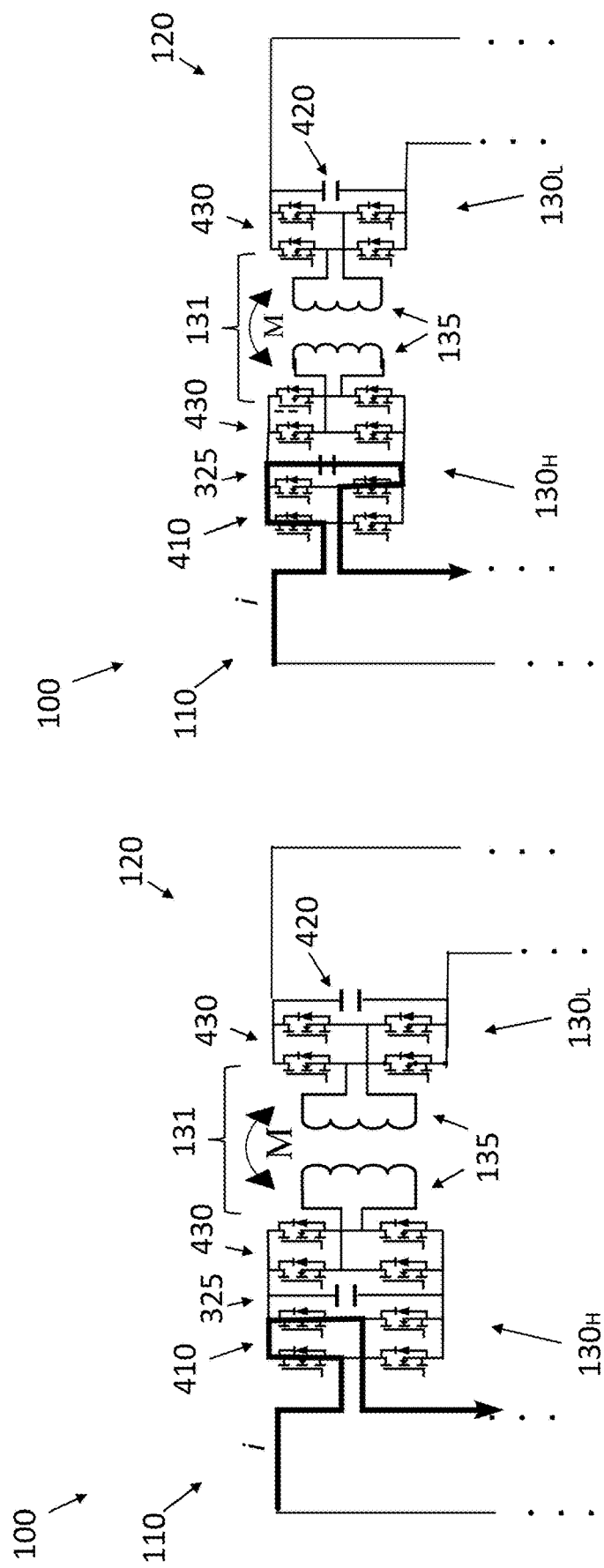
FIG. 5A illustrates current flow through a high side sub-module during normal operation.
FIG. 5B illustrates current flow through the high side sub-module during a fault condition.

FIGS. 5A and 5B show aspects of an exemplary power transfer system 100 to illustrate fault handling according to an exemplary embodiment. One module 131 with a high side sub-module $130_H$ and a low side sub-module 130L is shown. The exemplary high side sub-module $130_H$ includes converters 410 and 430 implemented as full bridge converters, a DC capacitor 325 implemented as a single DC bus capacitor, and a mutually coupled inductor 135 that also serves as the impedance network. The low side sub-module $130_L$ includes an inductor 135 (functioning as the impedance network, as well), a converter 430 serving as a rectifier and implemented as a full bridge converter, and a DC capacitor 325.

FIG. 5A shows a path of the load current i on the high side 110 during normal operation. The DC capacitor 325 of the high side sub-module $130_H$ transfers power to the low side 120 using the full bridge inverter (converter 430). Based on the amount of power transfer, the voltage of the DC capacitor 325 decreases over time and must be charged back to a nominal voltage.

FIG. 5B shows a path of the load current i on the high side 110 during recharge of the DC capacitor 325 of the high side sub-module $130_H$ or during a fault condition. During normal operation, shown in FIG. 5A, it may be determined that the DC capacitor 325 of the high side sub-module $130_H$ must be charged. Alternately, a fault may be detected. Fault detection is performed according to known and previously used techniques and is not detailed herein.

In either the case (i.e., to charge the DC capacitor 325 on the high side 110 or based on fault detection), the flow path of the load current i is switched to include the DC capacitor 325 of the high side sub-module $130_H$. When the purpose is to charge the DC capacitor 325 of the high side 110, the path shown in FIG. 5B is taken momentarily. When a fault is detected, the path shown in FIG. 5B is maintained until the fault is fully cleared. By switching from the current path shown in FIG. 5A to the one shown in FIG. 5B, the DC capacitor 325 in the high side sub-module $130_H$ is used to absorb the fault current and disrupt power transfer to the low side 120 during the fault condition. Because this capability is in each high side sub-module $130_H$, modular fault protection, rather than a single break in the circuit, is facilitated.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An electrical power distribution system comprising:
   a first high side sub-module including a first high side converter, a second high side converter, and a high side energy storage device connected between and in parallel with the first high side converter and the second high side converter, wherein the first high side sub-module is electrically coupled to a high side load that requires a high voltage or a medium voltage DC, the high voltage DC being higher than the medium voltage DC; and
   a first low side sub-module including a first low side converter, a second low side converter, and a low side energy storage device connected between and in parallel with the first low side converter and the second low side converter, wherein the first high side sub-module and the first low side sub-module are configured to be inductively coupled and the first high side sub-module and the first low side sub-module form a first module, wherein the first high side converter and the high side energy storage device establish a flow path to conduct a load current through the high side energy storage device in response to detecting a fault current detection.

2. The system according to claim 1, wherein the first low side sub-module is electrically coupled to a low side load that requires a low voltage DC, the low voltage DC being lower than the medium voltage DC.

3. The system according to claim 1, wherein the first low side sub-module is connected to a DC source and the first low side sub-module is configured to transfer power to the first high side sub-module.

4. The system according to claim 1, further comprising a second module including a second high side sub-module and a second low side sub-module that are inductively coupled.

5. The system according to claim 4, wherein the first high side sub-module and the second high side sub-module are connected in series to the high side load.

6. The system according to claim 4, wherein the first low side sub-module and the second low side sub-module are connected in series to a load, a battery, or a DC source.

7. The system according to claim 1, wherein the high side energy storage device or the low side energy storage device is a direct current (DC) capacitor.

8. The system according to claim 1, wherein the high side DC capacitor in the first high side sub-module is arranged to build up charge based on the fault current detection and to be outside a path of current flow based on a lack of the fault current detection.

9. The system according to claim 1, wherein the second high side converter is configured to function as an inverter, while the high side converter is configured to function as a DC-to-DC converter and the low side converter is configured to function as a rectifier.

10. A method of assembling an electrical power distribution system, the method comprising:
assembling a first high side sub-module to include a first high side converter, a second high side converter, and a high side energy storage device connected between and in parallel with the first high side converter and the second high side converter;
electrically coupling the first high side sub-module to a high side load that requires a high voltage or medium voltage DC, the high voltage DC being higher than the medium voltage DC;
assembling a first low side sub-module to include a first low side converter, a second low side converter, and a low side energy storage device connected between and in parallel with the first low side converter and the second low side converter; and
arranging the first high side sub-module and the first low side sub-module to be inductively coupled, wherein the first high side sub-module and the first low side sub-module form a first module,
wherein the first high side converter and the high side energy storage device establish a flow path to conduct a load current through the high side energy storage device in response to detecting a fault current detection.

11. The method according to claim 10, further comprising electrically coupling the first low side sub-module to a low side load that requires a low voltage DC being lower than the medium voltage DC.

12. The method according to claim 10, further comprising connecting the first low side sub-module to a DC source for power transfer from the first low side sub-module to the first high side sub-module.

13. The method according to claim 10, further comprising assembling a second module to include a second high side sub-module and a second low side sub-module that are inductively coupled.

14. The method according to claim 13, further comprising connecting the first high side sub-module and the second high side sub-module to the high side load in series.

15. The method according to claim 13, further comprising connecting the first low side sub-module and the second low side sub-module to a load, a battery, or a DC source in series.

16. The method according to claim 10, wherein the high side energy storage device or the low side energy storage device is a direct current (DC) capacitor.

17. The method according to claim 10, further comprising arranging the high side DC capacitor in the first high side sub-module to build up charge based on the fault current detection and to be outside a path of current flow based on a lack of the fault current detection.

18. The method according to claim 10, wherein the assembling the first high side sub-module includes arranging a second high side converter to function as an inverter, while the high side converter is configured to function as a DC-to-DC converter and the low side converter is configured to function as a rectifier.

* * * * *